United States Patent [19]

Esna-Ashari et al.

[11] Patent Number: 4,477,323
[45] Date of Patent: Oct. 16, 1984

[54] METHOD FOR RECOVERING ZINC FROM A SULFIDIC ZINC SOURCE

[75] Inventors: Mohammed Esna-Ashari, Bergisch Gladbach; Hermann Hilbrans, Langenfeld, both of Fed. Rep. of Germany

[73] Assignee: Klöckner-Humboldt-Deutz AG, Fed. Rep. of Germany

[21] Appl. No.: 549,740

[22] Filed: Nov. 8, 1983

[30] Foreign Application Priority Data

Nov. 11, 1982 [DE] Fed. Rep. of Germany ....... 3241740

[51] Int. Cl.³ .............................................. C25C 1/16
[52] U.S. Cl. .................................. 204/119; 204/114; 75/86; 75/109; 75/120; 23/304; 23/305 F; 23/295 R
[58] Field of Search ............... 23/304, 305 F, 295 R; 204/114, 119; 75/120, 109, 86

[56] References Cited
U.S. PATENT DOCUMENTS 4,379,037 4/1983 Bolton et al. ................... 204/119

FOREIGN PATENT DOCUMENTS 3031007 4/1982 Fed. Rep. of Germany .......... 75/86

Primary Examiner—R. L. Andrews
Attorney, Agent, or Firm—Hill, Van Santen, Steadman & Simpson

[57] ABSTRACT

A method for processing a sulfidic zinc source to recover metallic zinc wherein the source is leached with an electrolysis cell acid, the leaching product is separated into a liquor and a primary leaching residue, followed by drying and smelting of the dried leaching residue. The improvements of the present invention are directed primarily to the treatment of the liquor recovered from the leaching stage, and involve crystallizing out $Fe^{2+}$ from the liquor as a ferrous sulfate hydrate in a crystallization stage, separating the filtrate from the crystallization stage in a first separation stage to produce a filtrate and a residue, neutralizing and oxidizing the separated filtrate from the crystallization stage to precipitate the remaining $Fe^{2+}$ in a precipitation stage, separating the filtrate from the precipitation stage in a second separation stage and purifying the separated filtrate from the second separation stage before passing it to the electrolysis cell.

11 Claims, 1 Drawing Figure

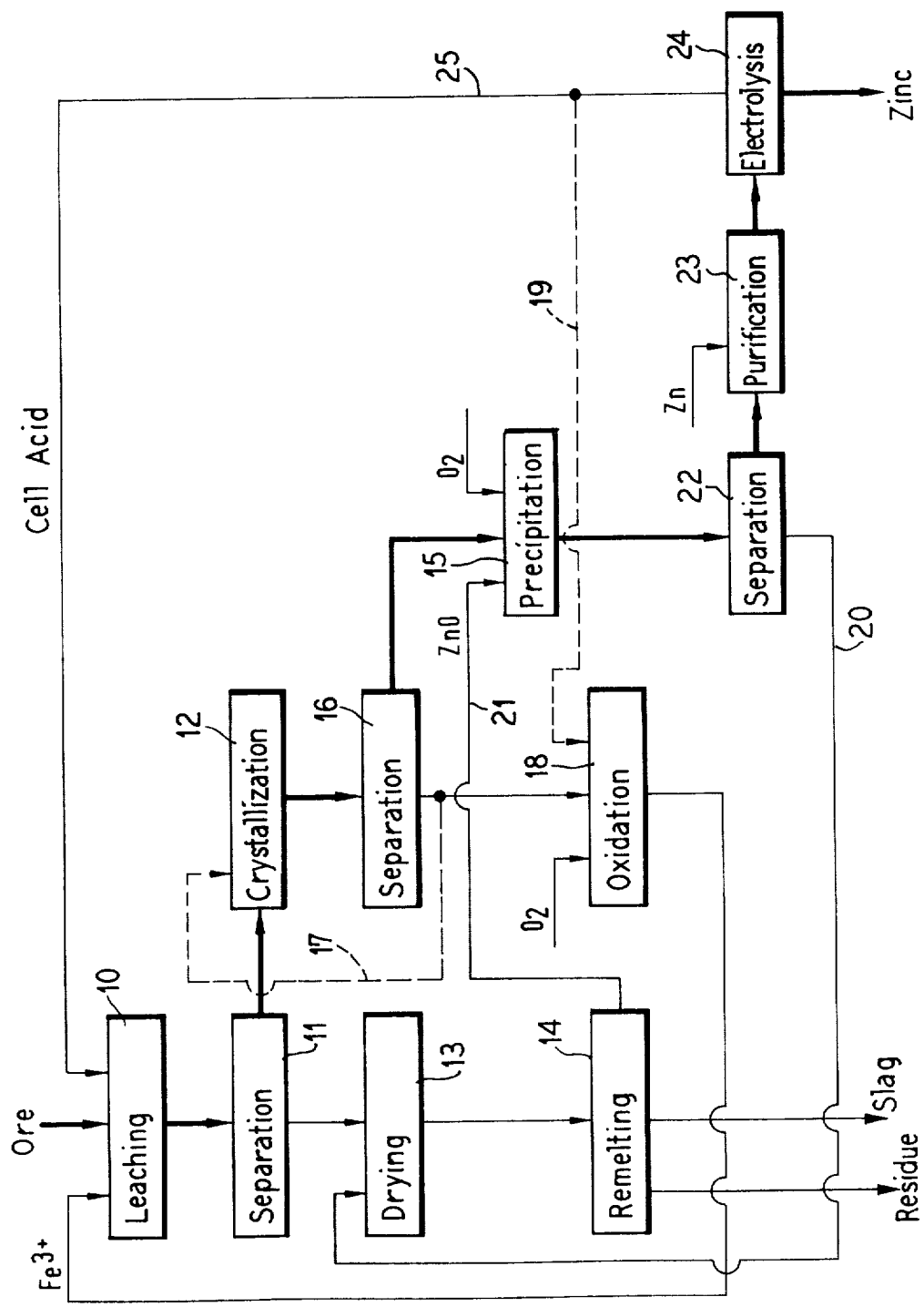

METHOD FOR RECOVERING ZINC FROM A SULFIDIC ZINC SOURCE

BACKGROUND OF THE INVENTION

1. Field of the Invention

This invention is in the field of recovery of zinc from a sulfidic zinc source by means of electrolysis and is primarily concerned with purifying the liquor obtained in the original leaching step to crystallize out harmful compounds in an economical way while producing residues which are not harmful.

2. Description of the Prior Art

This invention relates to a method for processing sulfidic zinc ores or concentrates by means of a primary leaching process utilizing acid from an electrolysis cell, followed by separation of liquor and primary leaching residue. The primary leaching residue is dried in a drying stage and is subsequently treated in a smelting furnace to produce slag and exhaust gases containing readily volatilizable metals and metal compounds including zinc oxide. The liquor is subjected to a further treatment for electrolysis for zinc recovery. The primary leaching is carried out at atmospheric pressure in the presence of $Fe^{3+}$ ions, and the primary leaching residue is resmelted into a storable slag without lead and cadmium upon combustion of the elemental sulfur contained therein. A sulfidic residue occurs. Additional zinc values are obtained from the zinc components volatilized in the smelting operation. A process of this type has been described in German Patent Application No. P 30 31 007.7.

Zinc production methods heretofore known in the prior art have several disadvantages. For one, the raw material selection is limited because of the presence of undesirable elements. Secondly, the process normally requires a multi-stage leaching process which involves high expenditure for capital and operating costs. The residues produced in the leaching operation create considerable leaching, filtration, clarification and storage problems, particularly when valuable metals are to be largely recovered. The resulting leaching residues represent a waste product which is harmful to the environment. The harmful substances contained in the residue, consisting of compounds of arsenic, antimony thallium, and the like, are readily washed out by rain water and could lead to contamination of the ground water. This makes it necessary to store such materials at specially protected installations. For a zinc works producing 100,000 metric tons annually, the quantity of residue amounts to about 30,000 tons per year of hematite or about 40,000 tons per year of goethite or about 50,000 tons per year of jarosite. Storing these considerable quantities of residue provides increasing difficulties in the acquisition of storage areas.

When processing sulfidic zinc concentrates for electrolytic zinc production, the concentrates are generally roasted in order to convert the sulfide into the acid-soluble oxide form. The exhaust gas contains $SO_2$ which for economic reasons should be processed into sulfuric acid. There must be a suitable market for the sulfuric acid product (about 2 tons of sulfuric acid are produced per ton of zinc) because storage facilities are limited and transport of the acid over long distances is not economical.

The roasted product in the conventional process is leached with cell acid from the electrolysis cell, iron residues are separated out, and the resulting neutral liquor is freed of elements such as copper, cobalt, nickel, aresenic and the like by means of liquor purification. The pure zinc sulfate solution proceeds to the electrolysis whereby the zinc is precipitated as metal. In order to obtain a high zinc extraction ratio, particularly from zinc ferrites formed in the roasting of the concentrates, the zinc must be placed in solution together with the iron. This is carried out by subjecting the liquor residues to a hot acid leaching after the original neutral leaching. Depending on the process variables, the dissolved iron is precipitated as jarosite, goethite or hematite and is storage in special storage areas.

It has also been suggested to carry out the removal of elemental sulfur from metal sulfides by means of pressure leaching in a sulfidic medium. Oxygen serves as an oxidizing agent for the sulfur formation. A process already introduced into industrial scale technology known as the Sherritt-Gordon process involves leaching zinc concentrates under pressure with oxygen at a pressure of about 10 bar and a temperature of 150° C. A zinc sulfate solution is produced which is supplied to the electrolysis circulation and elemental sulfur is produced in liquid form. This method has an advantage over conventional roasting, leaching, and production of sulfuric acid only when there is no need for sulfuric acid. There are special disadvantages of the process which include the fact that the process must be carried out under pressure and that autoclaves are employed. The difficulty of separating elemental sulfur from the liquor residue containing valuable metals is also present. Direct extraction of sulfidic materials, however, has the advantage that the metals are brought directly into solution in the leaching process without previous roasting and thus conversion of the sulfur into the gaseous state, so that the sulfur can be elementally produced. This elemental sulfur can be stored for unlimited times and can be processed into sulfur-containing products depending on the market situation.

Methods for the pyrometallurgical processing of the liquor residues have also been proposed and partially employed on an industrial scale. These methods, however, exhibit disadvantages since the residues must be dried and pelletized for the further thermal processing. These process steps are highly expensive. Further, these processes require a high energy outlay in the form of metallurgical coke, oil or other fuels and cause the formation of dust and of exhaust gases containing $SO_2$.

In our aforementioned previous German application, there is disclosed a direct extraction of sulfidic ores, concentrates or other metallurgical intermediate products as an alternative to conventional roasting, leaching, production of sulfuric acid and pyrometallurgical processing of leaching residues. The previous application discloses a method for processing sulfudic zinc ores wherein the liquor separated out after the primary leaching is subjected to a liquor purification before it is supplied to the electrolysis.

The formation of elemental sulfur without the application of pressure provides a sulfidic primary leaching of zinc concentrate upon the addition of $Fe^{3+}$ ions according to the reaction:

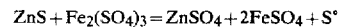

$$ZnS + Fe_2(SO_4)_3 = ZnSO_4 + 2FeSO_4 + S°$$

The conversion proceeds quickly and completely in the presence of large quantities of $Fe^{3+}$ ions. An effective oxidation of $Fe^{2+}$ into $Fe^{3+}$ must occur in order to guarantee an adequate $Fe^{3+}$ ion concentration. The oxidation proceeds with oxygen according to the equation:

$$2FeSO_4 + \tfrac{1}{2}O_2 + H_2SO_4 = Fe_2(SO_4)_3 + H_2O$$

This conversion is greatly dependent on the oxygen pressure and on the $Fe^{2+}$ ion concentration. Copper ions and activated carbon promote the reaction. In addition to elemental sulfur, the primary leaching residue contains valuable mirror metals and zinc.

The known prior art exhibits numerous problems which are still unresolved, namely:
(1) the zinc yield in the primary leaching is low;
(2) a high $Fe^{3+}$ ion concentration is required for the primary leaching;
(3) the oxidation of $Fe^{2+}$ ions into $Fe^{3+}$ ions is very slow;
(4) the separation of $FeSO_4$ from the filtrate of the primary leaching step is difficult;
(5) a suitable solution for the return of the $Fe^{3+}$ into the leaching circulation has not yet been developed;
(6) the storage problem according to the conventional method has not yet been resolved;
(7) the separation of elemental sulfur from the primary leaching residue by means of flotation or hot filtration is very costly;
(8) an optimum concept for processing the primary leaching residue for recovering valuable metals and the zinc content has not yet been developed.

SUMMARY OF THE INVENTION

In addition to avoiding the disadvantages and difficulties of the prior art, the method of the present invention seeks to prepare the liquor separated from the primary leaching step for zinc electrolysis in a more efficient manner, and still achieve an electrolytic purity of a maximum of 5 to 10 mg/l Fe ions. Consequently, the zinc losses are kept at a minimum and a wide variety of raw materials can be used, even those containing objectionable substances.

The objects of the present invention are achieved by treatment of the separated liquor from the leaching step in the following method steps:
(a) a crystallization stage with the crystallization of the $Fe^{2+}$ out of the liquor as a ferrous sulfate hydrate, $FeSO_4.xH_2O$,
(b) separation of the filtrate from the crystallization stage,
(c) precipitating the remaining $Fe^{2+}$ ions in a precipitation stage by means of neutralization and oxidation,
(d) separation of the filtrate from the precipitation stage, and
(e) a purification stage for the filtrate to bring it up to electrolysis purity.

The precipitation stage is advantageous insofar as certain objectionable metals such as As, Ge, and the like, are also precipitated out as a result. Consequently, a purification of the filtrate already occurs before the actual purification stage.

The crystallization stage is also conducted under conditions under which double salt developers such as manganese, magnesium, and thallium are precipitated out in the crystallization stage.

One of the features of the present invention is that the crystallization is carried out under relatively low temperature conditions, the liquor being cooled with constant stirring to a temperature range of 5° to 20° C., and preferably 10° C. in the crystallization stage.

A further feature of the invention resides in separating out iron sulfate crystals from the crystallization stage and using them to inoculate the liquor in the crystallization stage. Crystallization time can be shortened as a result of this measure.

Another feature of the present invention is that the $Fe^{2+}$ present in the separated residue from the crystallization is oxidized to $Fe^{3+}$ in an oxidation stage with the addition of oxygen or gas containing oxygen and is then recycled back to the primary leaching step. Such a procedure allows an oxidation process under optimum working conditions. Even without the addition of cell acid, it becomes possible by so doing to produce precipitatable trivalent iron compounds such as iron hydroxide, goethite, jarosite or iron sulfates as well as hydroxide-sulfate compounds by means of suitable process control, these materials being then returned to the primary leaching stage.

Another feature of the present invention is that the heat being released in the crystallization stage can be employed for re-solution of the iron sulfate crystals in the oxidation stage. A high degree of energy exploitation is thereby achieved.

Zinc oxide leaving the smelting furnace in the exhaust gas can be supplied to the precipitation stage. As a result, the operating costs can be further reduced.

In another feature of the present invention, the residue separated out after the precipitation stage is supplied to the drying stage. The loss of valuable metals is thereby largely avoided.

Another feature of the present invention resides in using a relatively low leaching temperature, approximately 70° C. The low operating temperature means a reduction of operating costs in comparison to the traditional process.

One of the advantages of the present invention is that it is capable of handling existing ores and concentrates having high iron, copper, magnesium, and manganese contents. In addition to employing such lower grade sulfidic zinc ores and concentrates, the problems of storage of residue deposits having high iron, copper, magnesium and manganese contents are also reduced. This procedure is made possible because the metals manganese, magnesium and thallium are crystallized out of sulfates in the crystallization stage in addition to iron sulfate.

BRIEF DESCRIPTION OF THE DRAWING

The single FIGURE of the drawing is a flow chart of a method for the production of zinc according to the present invention.

DESCRIPTION OF THE PREFERRED EMBODIMENTS

Sulfidic zinc ore and/or concentrate is subjected to an atmospheric pressure, sulfuric acid primary leaching in a leaching stage at moderate temperatures on the order of 70° C. with the addition of cell acid and $Fe^{3+}$ ions. After a short reaction time, a large part of the zinc and a small proportion of the accompanying metals go into solution. The sulfur remains behind in elemental form together with valuable metals. In a solids/liquid separation stage 11, the material is separated into a liquor and a residue. The liquor is supplied as a filtrate to a crystallization stage 12 and the residue is treated further in a drying stage 13. The conditions of crystallization are such that $Fe^{2+}$ is crystallized out as a ferrous sulfate, $FeSO_4.xH_2O$.

The primary leaching residue together with the elemental sulfur are dried in the drying stage 13 at a temperature below the melting point of sulfur, i.e., below 119° C. The dried primary leaching residue is then supplied to a re-melting stage 14 where it is subjected to melting, for example, in a melting cyclone. The process is controlled in a known manner so that a residue containing concentrations of copper, gold and silver, a transportable slag, as well as exhaust gases, are produced. The exhaust gases contain readily volatilizable metals and metal compounds, including zinc oxide. The exhaust gases are then transferred to a precipitation stage 15.

The zinc sulfate crystallization in the crystallization stage 12 is slight due to the different solubilities of ferrous sulfate and zinc sulfate. The zinc sulfate thereby co-precipitated out is not considered a loss because it is returned into the liquor circulating stream. The undesirable accompanying metals such as manganese, magnesium, thallium, and the like, form double salts with $FeSO_4$ and can thus be eliminated in the residue in a following separation stage 16. A part of the separated iron sulfate crystals can thereby be employed for inoculating the liquor in the crystallization stage 12 as indicated by the dashed line 17.

The crystallization residue is partially re-dissolved in an oxidation stage 18 following the crystallization stage. Upon addition of oxidation agents, for example, oxygen or gas containing oxygen, and, alternatively, cell acid by means of a line 19, the $FeSO_4$ crystals are converted into $Fe^{3+}$ ions which are subsequently re-introduced into the primary leaching stage 10 through a line 20. The filtrate separated off after the crystallization stage still contains some iron which, except for a few mg/l, must still be removed before the beginning of the electrolysis. To accomplish this, the filtrate is neutralized in the precipitation stage 15, oxidized, and the iron is precipitated as a solid iron compound such as $Fe(OH)_3$. Zinc oxide can be used with particular advantage in the precipitation stage 15 as a product of the primary leaching residue processing. Zinc oxide is shown being introduced into the precipitation stage 15 by means of a line 21. The separated filtrate of the precipitation stage 15 is then supplied to a second separation stage 22 and then to a purification stage 23. In the purification stage 23, the harmful elements such as copper, cobalt, cadmium, nickel and the like are eliminated by cementation with metallic zinc to form a cementate. The purified liquor is supplied to an electrolysis cell 24 where the zinc is metallically precipitated. The partially de-zinced liquor is supplied as the cell acid through a line 25 back into the leaching stage 10, and optionally through the line 19 into the oxidation stage 18.

The following specific examples illustrate procedures according to the present invention.

EXAMPLE 1

In this example, the treated material was a zinc flotation concentrate having the following grain analysis:

| Grain size microns | Mass Proportion % |
|---|---|
| 125 | 2.0 |
| 125–90 | 6.6 |
| 90–63 | 13.5 |

-continued

| Grain size microns | Mass Proportion % |
|---|---|
| 63–40 | 15.9 |
| <40 | 62.0 |

An amount of 800 g of the concentrate was leached in a single stage with cell acid containing 200 g/l $H_2SO_4$, 50 G/l Zn and ferric sulfate in the ratio of $Fe^{3+}$:Zn of 1:1.4 for 30 minutes with an impeller type mixer at 70° C. with the addition of air. During this time, 71.7% of the zinc and 39.4% of the iron were brought into solution. The liquor residue consisting of 540 g contained:
21.8% Zn
9.4% Fe
35.6% S°
13.6% S⁻⁻

EXAMPLE 2

A $ZnSO_4/FeSO_4$ liquor produced according to Example 1 and containing 52 g/l of $Fe^{2+}$ before the $FeSO_4$ crystallization was cooled under constant agitation. The following table shows the $Fe^{2+}$ content of the liquor as a function of the temperature:

| Start of crystallization: | | |
|---|---|---|
| 40° C. | 52 | g/l fe²⁺ |
| 30 | 46.4 | |
| 20 | 30.8 | |
| 10 | 22.8 | |
| 0 | 17.0 | |
| −5 | 15.0 | |

EXAMPLE 3

The $FeSO_4$ crystals produced according to Example 2 were dissolved with the addition of heat and cell acid and were oxidized with oxygen in a flotation cell at 70° C. The initial $Fe^{2+}$ concentration amounted to 43.3 g/l and the pH value was 1.6. The $Fe^{3+}$ concentration amounted to 16.5 g/l after a test time of one hour and amounted to 22.6 g/l after two hours.

From the foregoing it will be observed that the method of the present invention provides a convenient and economical means for treating leaching residues and leaching liquors to provide an overall zinc recovery process which is economical and does not provide severe disposal problems.

It should be evident that various modifications can be made to the described embodiments without departing from the scope of the present invention.

We claim as our invention:

1. In a method for processing a sulfidic zinc source which includes the steps of leaching said source with an electrolysis cell acid, separating the leaching product into liquor and a primary leaching residue, drying said primary leaching residue in a drying stage, melting the dried leaching residue to produce a residue and a zinc oxide containing exhaust gas, the improvement which comprises the steps of:
   crystallizing out $Fe^{2+}$ from said liquor as a hydrate, $FeSO_4.xH_2O$ in a crystallization stage,
   separating the filtrate from said crystallization stage in a first separation stage to produce a filtrate and a residue,
   neutralizing and oxidizing the separated filtrate to precipitate the remaining $Fe^{2+}$, separating the filtrate from the precipitation stage in a second separation stage, and purifying the separated filtrate from the second separation stage to electrolysis purity wherein the concentration of Fe ions is not in excess of 10 mg/l.

2. A method according to claim 1 which includes the step of:

crystallizing out the double salt forming metals manganese, magnesium, and thallium in said crystallization stage.

3. A method according to claim 1 wherein:

the temperature in said crystallization stage is maintained in the range from 5° to 20° C. under conditions of constant agitation.

4. A method according to claim 1 which includes the step of:

inoculating the liquor in said crystallization stage with iron sulfate crystals separated from said crystallization stage.

5. A method according to claim 1 which includes the steps of:

oxidizing the $Fe^{2+}$ in the residue from said first separation stage to $Fe^{3+}$ by means of an oxygen-containing gas in an oxidation stage, and returning the oxidized product to the leaching step.

6. A method according to claim 5 in which:

heat released in the crystallization stage is used to redissolve the iron sulfate crystals in the oxidation stage.

7. A method according to claim 1 which includes the step of:

passing the zinc oxide from said exhaust gas into said precipitation stage.

8. A method according to claim 1 which includes the step of:

returning the residue from said second separation stage into said drying stage.

9. A method according to claim 1 which includes the step of:

conducting the leaching at a temperature of approximately 70° C.

10. A method according to claim 1 in which:

said sulfidic zinc source contains relatively high contents of iron, copper, magnesium, and manganese.

11. A method for recovering zinc from a sulfidic zinc source which comprises the following stages:

(1) leaching said source with an electrolysis cell acid in the presence of recycled $Fe^{3+}$ at atmospheric pressure, (2) separating a liquor and a primary leaching residue from stage (1), (3) drying said primary leaching residue, (4) melting the dried residue from stage (3) to produce a slag and an exhaust gas containing readily volatilizable metals and metal compounds including zinc oxide, (5) subjecting the liquor from stage (2) to crystallization to form a ferrous sulfate hydrate, (6) separating a filtrate and residue from stage (5), (7) partially redissolving the residue from stage (6), (8) treating the redissolved residue with an oxygen-containing gas to convert the ferrous sulfate into $Fe^{3+}$ ions, (9) recycling the $Fe^{3+}$ ions from stage (8) into leaching stage (1),

(10) neutralizing and oxidizing the filtrate separated in stage (5) in a precipitation stage in the presence of zinc oxide produced in stage (4) to precipitate out iron compounds and leave a filtrate containing undesired metals,

(11) treating the filtrate from stage (10) with zinc to form a zinc cementate and a purified liquor,

(12) subjecting the purified liquor from stage (11) to electrolysis in a sulfuric acid cell and

(13) recycling acid from said cell into leaching stage (1).

* * * * *